(12) United States Patent
Mou et al.

(10) Patent No.: US 8,929,104 B2
(45) Date of Patent: Jan. 6, 2015

(54) FLOW CONTROL SYSTEM

(75) Inventors: Changhua Mou, Beijing (CN); Maolin Wang, Beijing (CN)

(73) Assignee: Bejing Sevenstar Electronics Co., Ltd., Beijing (CN)

( * ) Notice: Subject to any disclaimer, the term of this patent is extended or adjusted under 35 U.S.C. 154(b) by 176 days.

(21) Appl. No.: 13/701,535

(22) PCT Filed: Dec. 14, 2010

(86) PCT No.: PCT/CN2010/079778
§ 371 (c)(1),
(2), (4) Date: Dec. 3, 2012

(87) PCT Pub. No.: WO2012/068753
PCT Pub. Date: May 31, 2012

(65) Prior Publication Data
US 2013/0075635 A1  Mar. 28, 2013

(30) Foreign Application Priority Data

Nov. 22, 2010 (CN) .......................... 2010 1 0557717

(51) Int. Cl.
*H02M 3/335* (2006.01)
*F16K 31/00* (2006.01)
*G05D 7/06* (2006.01)

(52) U.S. Cl.
CPC .............. *F16K 31/00* (2013.01); *G05D 7/0635* (2013.01)
USPC .............................................. 363/25; 363/26

(58) Field of Classification Search
USPC ........... 363/22, 23, 24, 25, 26, 133, 134, 139, 363/16, 17
See application file for complete search history.

(56) References Cited

U.S. PATENT DOCUMENTS 5,668,706 A * 9/1997 Sakai et al. ................ 363/21.05
RE36,040 E * 1/1999 Ou ................................. 363/25
6,798,670 B2 * 9/2004 King ............................... 363/17

* cited by examiner

*Primary Examiner* — Nguyen Tran
(74) *Attorney, Agent, or Firm* — Anova Law Group, PLLC

(57) ABSTRACT

The present invention provides a new type flow control system comprising a valve control circuit and a power source circuit. Two terminals of the primary coil of the power source circuit transformer are respectively connected with two power source circuit FETs, the secondary coil of the power source circuit transformer is connected to the voltage output terminal of the power source circuit through a power source rectification circuit. The gates of the power source circuit FETs are connected with a switching regulator. The AC input terminal of the valve control circuit is connected with a valve control circuit transformer. The primary coil of the valve control circuit transformer is connected with a valve control circuit FET, the secondary coil of the transformer is connected to a mechanical valve through a valve control rectification circuit. A microcontroller outputs PWM signals to the gate of the valve control circuit FET.

6 Claims, 3 Drawing Sheets

--Prior Art--

--Prior Art--

FLOW CONTROL SYSTEM

CROSS-REFERENCE TO RELATED APPLICATION

This application claims the priority benefit of China application serial no. 201010557717.8, filed Nov. 22, 2010. All disclosure of the China application is incorporated herein by reference.

FIELD OF THE INVENTION

The present invention relates to a flow controller, and more particularly to a new type flow control system.

BACKGROUND OF THE INVENTION

Flow measurement and control take an important part in the field of industry. Currently, flow controllers on the market for controlling the passing flow of a device comprise gas flow controller and fluid flow controller. As shown in FIG. 1, in a flow controller, the flow signal measured by a sensor, which is usually an analog voltage signal or an analog current signal, is converted to be a digital signal by an A/D converter and transmitted to a microcontroller. After calculation, the microcontroller outputs a digital control signal to a D/A module, which converts the digital control signal to an analog voltage. Then, the valve control unit converts the analog voltage to an electrical signal to control the mechanical valve. The mechanical valve can be of any structure such as an electromagnetic valve, a thermal valve or a Piezoelectric valve and so on, which realizes different work modes according to the voltage or the current of the electrical signal. In other words, the flow control can be realized by controlling the electrical signal. As shown in FIG. 2, the conventional valve control circuit comprises at least one D/A module performing the function of digital value to analog voltage conversion; one or more operational amplifier U2 performing amplifying and gain adjusting; and one or more transistors of high power Q1, Q2.

However, the conventional valve control circuit has the following disadvantages: since the valve control circuit requires high precision for the D/A module and large power for the transistors, the power loss of the whole product may be excessively high. Furthermore, the heat radiation from the transistors may also cause the change of the environmental temperature, which may reduce the measurement accuracy of the circuit as well as the service life of the components.

SUMMARY OF THE INVENTION

Accordingly, at least one objective of the present invention is to provide a new type flow control system of low power, high measurement accuracy and long service life.

To achieve these and other advantages and in accordance with the objective of the invention, as embodied and broadly described herein, the invention provides a new type flow control system comprising a valve control circuit comprising a microcontroller, a valve control circuit FET, a valve control circuit transformer and a valve control rectification circuit; and a power source circuit comprising a power source circuit transformer, a switching regulator, two power source circuit FETs and a power source rectification circuit; the AC input terminal of the power source circuit is connected with the power source circuit transformer; wherein two terminals of the primary coil of the power source circuit transformer are respectively connected with the two power source circuit FETs, and the secondary coil of the power source circuit transformer is connected to the voltage output terminal of the power source circuit through the power source rectification circuit; the gates of the power source circuit FETs are connected with the switching regulator; the AC input terminal of the valve control circuit is connected with the valve control circuit transformer; the primary coil of the valve control circuit transformer is connected with the valve control circuit FET, and the secondary coil of the valve control circuit transformer is connected to a mechanical valve through the valve control rectification circuit; the microcontroller outputs PWM signals to the gate of the valve control circuit FET.

Compared with the conventional technology, the new type flow control system utilizes PWM signal to control the mechanical valve, which reduces the heat loss and power consumption, enhances the control precision, the control stability as well as the service life.

BRIEF DESCRIPTION OF THE DRAWINGS

The flow control system of the present invention will be elucidated by reference to the following embodiments and the accompanying drawings, in which.

DETAILED DESCRIPTION OF THE EMBODIMENTS

The flow control system of the present invention will be described in further details hereinafter with respect to the embodiments and the accompanying drawings FIG. 3~FIG. 5.

Figure 1:
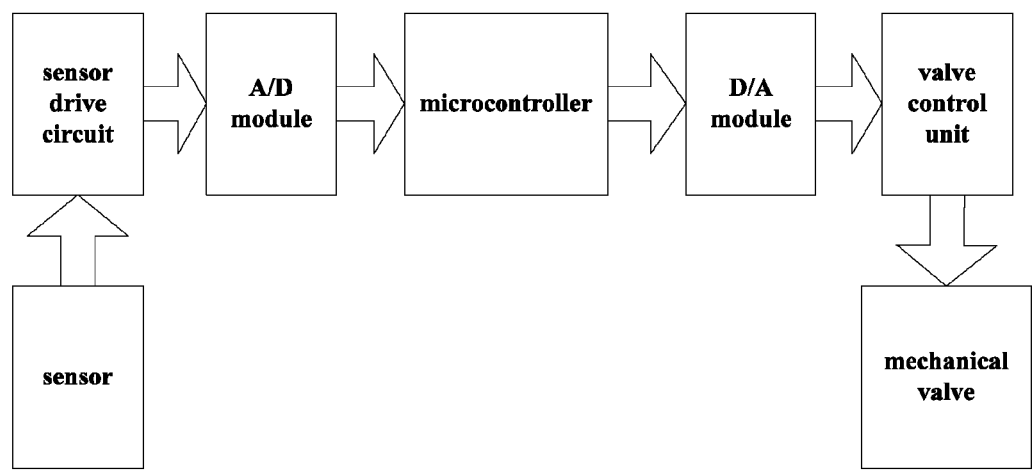
FIG. 1 is a functional block diagram of the conventional flow controller.
Figure 2:
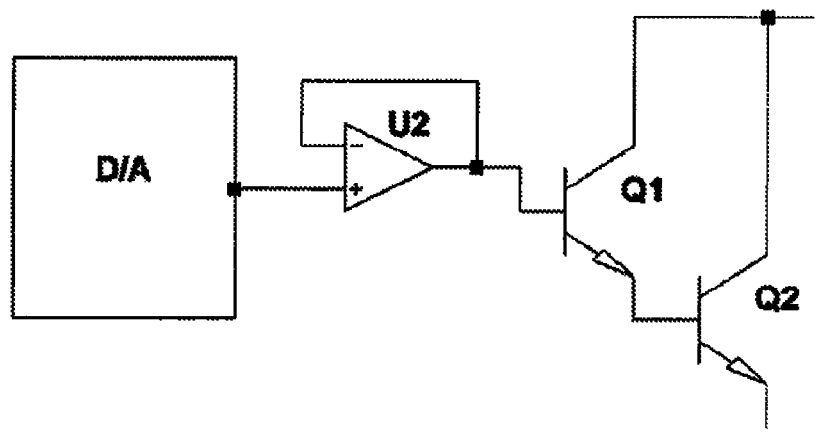
FIG. 2 is a circuit diagram of the conventional valve control circuit.
Figure 3:
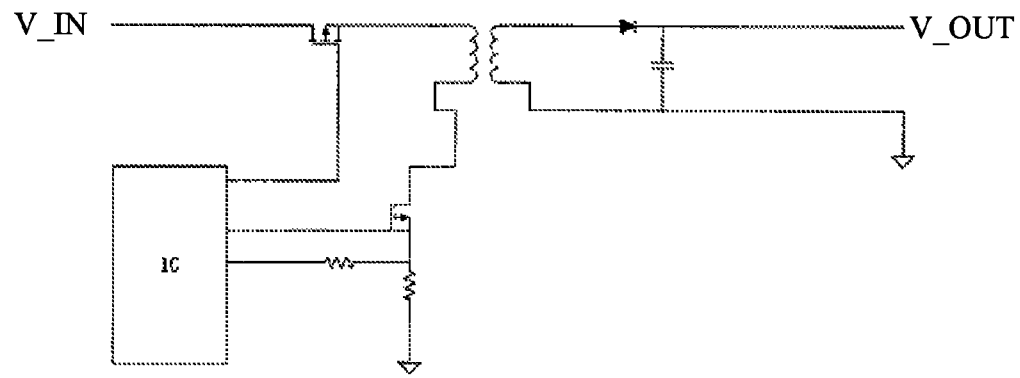
FIG. 3 is a circuit diagram of the power source circuit according to one embodiment of the present invention.

Referring to FIG. 3 of the drawings, the power source circuit according to one embodiment of the present invention is illustrated. The power source circuit comprises a switching regulator IC, a power source circuit transformer, two power source circuit FETs and a power source rectification circuit, wherein, the switching regulator IC outputs a frequency signal, which is an AC signal to control the on-off of the power source circuit FET so as to regulate the duty cycle of the input AC voltage signal of the power source circuit. The regulated input AC voltage signal will be converted to a DC voltage signal after being modulated by the power source circuit transformer and the power source rectification circuit, and outputted. Therefore, the outputted DC voltage signal can be adjusted by regulating the duty cycle of the frequency signal.

Figure 4:
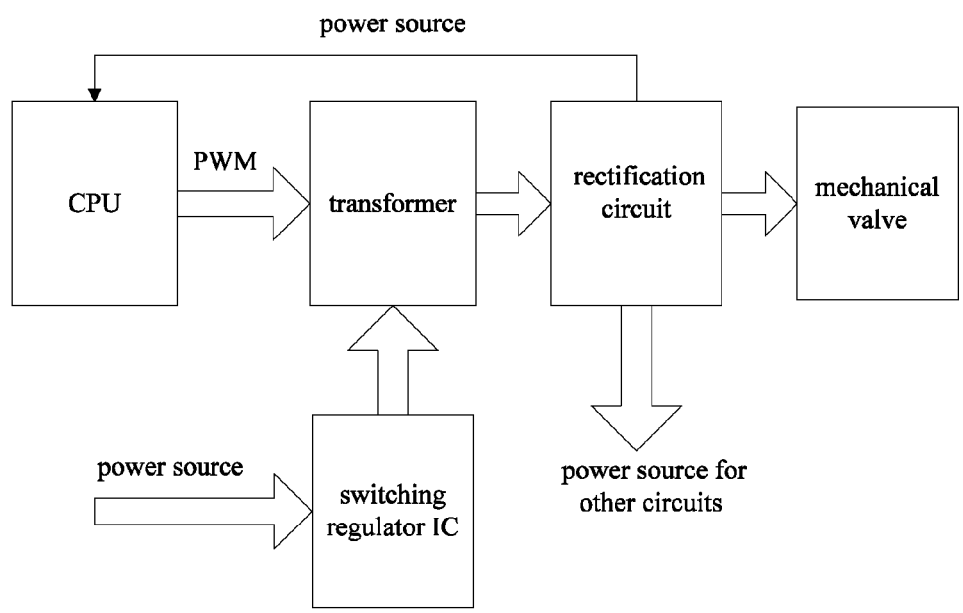
FIG. 4 is a functional block diagram of the flow control system according to one embodiment of the present invention.

FIG. 4 is a functional block diagram of the valve control circuit according to one embodiment of the present invention. The circuit principle mentioned above can also be applied to the valve control circuit. As shown in FIG. 4, the microcontroller CPU outputs PWM signals to control the valve control transformer through the valve control circuit FET. Then, the input AC voltage signal of the valve control circuit will be converted to a valve control signal after being modulated by the valve control transformer and the valve control rectification circuit.

Figure 5:
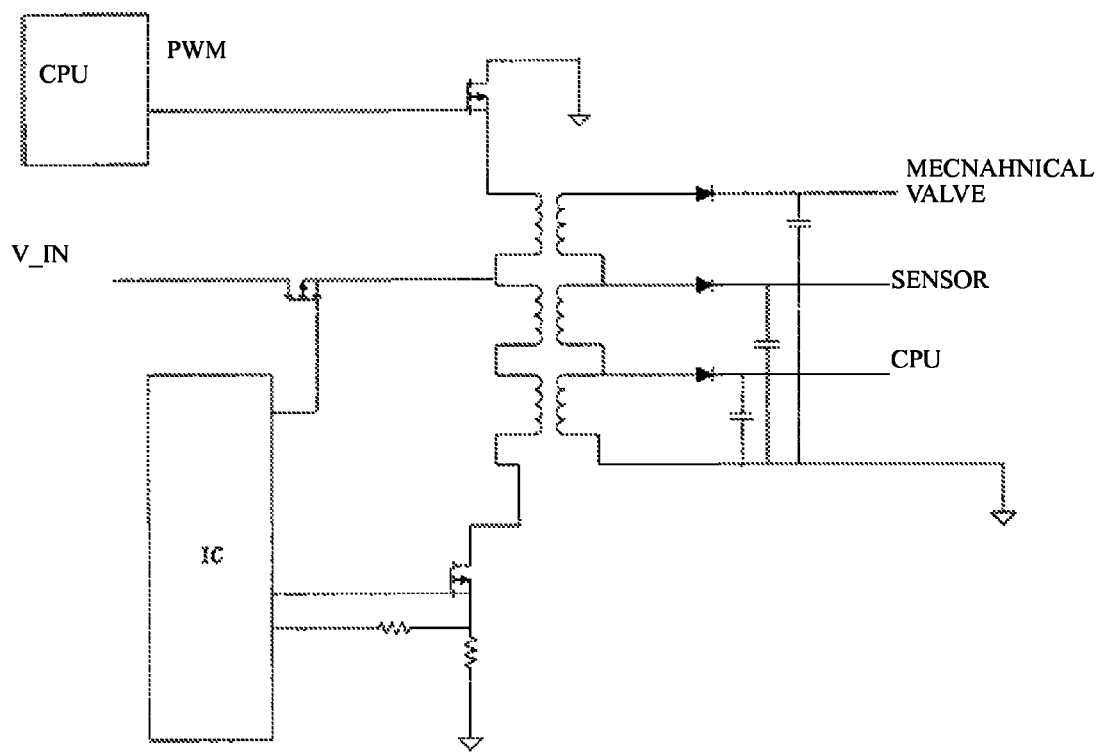
FIG. 5 is a circuit diagram of the flow control system according to one embodiment of the present invention.

FIG. 5 is a circuit diagram of the flow control system according to one embodiment of the present invention. As shown in FIG. 5, the power source circuit transformer is connected to the AC input terminal of the power source circuit though the power source circuit FET. Two terminals of the primary coil of the power source circuit transformer are respectively connected with the two power source circuit FETs; the secondary coil of the power source circuit transformer is connected to the voltage output terminal of the power source circuit through the power source rectification circuit; the gates of the power source circuit FETs are connected with the switching regulator IC. The switching regulator IC outputs a frequency signal, which is an AC signal, to control the on-off of the power source circuit FETs so as to regulate the duty cycle of the input AC voltage signal of the power source circuit. The regulated input AC voltage signal will be converted to a DC voltage signal after being modulated by the power source circuit transformer and the power source rectification circuit, and outputted. Therefore, the outputted DC voltage signal can be adjusted by regulating the duty cycle of the frequency signal. In some embodiments, the power source circuit comprises a plurality of voltage output terminals and the power source circuit can supply power to other circuits such as a sensor circuit.

The valve control circuit comprises a microcontroller, a valve control circuit FET, a valve control circuit transformer, and a valve control rectification circuit. The valve control circuit transformer is connected with the AC input terminal of the valve control circuit; the primary coil of the valve control circuit transformer is connected with the valve control circuit FET, and the secondary coil of the valve control circuit transformer is connected to the mechanical valve through the valve control rectification circuit; the microcontroller outputs PWM signals to the gate of the valve control circuit FET.

In the embodiment, the power source circuit comprises a plurality of voltage output terminals. One of the voltage output terminals is connected to the microcontroller to provide power supply to the microcontroller. The microcontroller CPU outputs PWM signals to the gate of the valve control circuit FET to control the on-off of the valve control circuit FET, so as to control the valve control circuit transformer. Then, the regulated input AC voltage signal can be converted to a valve control signal after being modulated by the valve control circuit transformer and the valve control circuit rectification circuit, so as to control the mechanical valve.

In some embodiments of the present invention, the power source circuit and the valve control circuit share one transformer, specifically, one terminal of the primary coil of the valve control circuit transformer is connected with the valve control circuit FET, and the other terminal is connected between the power source circuit FET and the primary coil of the power source circuit transformer.

In summary, the microcontroller CPU outputs PWM signals to control the mechanical valve through the valve control circuit FET and the valve control circuit rectification circuit, the valve control circuit transformer and the rectification circuit based on digital computer system so as to realize the control of the mechanical portion by frequency signals. In addition, the power source portion of the flow control system is combined skillfully with the valve control portion to form an integrative valve control design, which not only provides power supply to the whole product but also controls the mechanical valve, thus the control precision and performance stability are enhanced. Furthermore, the flow control system omits the components such as the D/A module and the transistors of great power in the conventional valve control circuit, which can reduce the system heat loss, enhance the control precision and service life and perform wide power supply conveniently.

Although the present invention has been disclosed as above with respect to the preferred embodiments, they should not be construed as limitations to the present invention. Various modifications and variations can be made by the ordinary skilled in the art without departing the spirit and scope of the present invention. Therefore, the protection scope of the present invention should be defined by the appended claims.

The invention claimed is:

1. A flow control system comprising a valve control circuit and a power source circuit;

wherein the power source circuit comprises an AC input terminal receiving an input AC voltage signal, a power source circuit transformer, a switching regulator, two power source circuit FETs, a power source rectification circuit and at least one voltage output terminal; the AC input terminal of the power source circuit is connected with the power source circuit transformer though one of the power source circuit FETs; two terminals of the primary coil of the power source circuit transformer are respectively connected with the two power source circuit FETs, the secondary coil of the power source circuit transformer is connected to the voltage output terminal of the power source circuit through the power source rectification circuit; the gates of the power source circuit FETs are connected with the switching regulator; the switching regulator outputs a frequency signal to control the on-off of the power source circuit FETs and regulates the duty cycle of the input AC voltage signal of the power source circuit so as to adjust the output DC voltage signal of the power source circuit which is converted from the input AC voltage signal by the power source circuit transformer and the power source rectification circuit;

wherein the valve control circuit comprises a microcontroller, a valve control circuit transformer, a valve control circuit FET and a valve control rectification circuit; one terminal of the primary coil of the valve control circuit transformer is connected with the valve control circuit FET and the other terminal is connected with the AC input terminal of the power source circuit, the secondary coil of the valve control circuit transformer is connected to a mechanical valve through the valve control rectification circuit; the microcontroller outputs PWM signals to the gate of the valve control circuit FET.

2. The flow control system according to claim 1, wherein one terminal of the primary coil of the valve control circuit transformer is connected with the valve control circuit FET, the other terminal is connected between the power source circuit FET and the primary coil of the power source circuit transformer.

3. The flow control system according to claim 2, wherein the power source circuit comprises a plurality of the voltage output terminals.

4. The flow control system according to claim 3, wherein one of the voltage output terminals is connected with the microcontroller and supplies power to the microcontroller.

5. The flow control system according to claim 1, wherein the power source circuit comprises a plurality of the voltage output terminals.

6. The flow control system according to claim 3, further comprises a sensor circuit and one of the voltage output terminals is connected with the sensor circuit.

* * * * *